United States Patent [19]

Carter et al.

[11] Patent Number: 5,498,387
[45] Date of Patent: *Mar. 12, 1996

[54] METHOD OF MANUFACTURING A HELICAL STRUCTURE

[75] Inventors: Daniel S. Carter, Sandy Hook, Conn.; Dennis M. Rupp; David O. Bess, both of Chico, Calif.

[73] Assignees: The Vendo Company; Wrex Products, Inc., a part interest

[ * ] Notice: The term of this patent shall not extend beyond the expiration date of Pat. No. 5,411,696.

[21] Appl. No.: 83,168

[22] Filed: Jun. 29, 1993

[51] Int. Cl.⁶ ................................................. B29C 45/44
[52] U.S. Cl. ................... 264/219; 264/318; 264/328.1; 425/DIG. 58
[58] Field of Search ...................... 264/219, 318, 264/328.1, 328.8; 425/577, DIG. 58

[56] References Cited

U.S. PATENT DOCUMENTS

| 2,949,636 | 8/1960 | Mastin | 425/DIG. 58 |
|---|---|---|---|
| 2,994,921 | 8/1961 | Hultgren | 425/577 |
| 3,595,301 | 7/1971 | Bauer | 425/577 |
| 3,705,644 | 12/1972 | Kawchitch | 198/664 |
| 4,515,342 | 5/1985 | Boskovic | 425/577 |
| 4,693,611 | 9/1987 | Verkler | 425/206 |
| 4,852,719 | 8/1989 | Lapeyre | 198/666 |
| 4,871,505 | 10/1989 | Lapeyre | 425/542 |
| 4,892,696 | 1/1990 | Murakami et al. | 264/219 |
| 4,913,280 | 4/1990 | Whyman | 198/659 |
| 4,976,341 | 12/1990 | Lundell | 198/666 |
| 5,099,985 | 3/1992 | Lapeyre | 198/658 |
| 5,122,052 | 6/1992 | Trame et al. | 425/577 |

FOREIGN PATENT DOCUMENTS

| 49-21420 | 5/1974 | Japan | 264/318 |

*Primary Examiner*—Robert B. Davis
*Attorney, Agent, or Firm*—Worrel & Worrel

[57] ABSTRACT

A helical structure having a shaft defining an axis of rotation and a substantially helical flight extending about the axis of rotation and composed of a plurality of sections each having a segment disposed in substantially right angular relation to the axis of rotation. A method for manufacturing a helical structure or the like including the steps of producing a mold having a mold cavity defining a configuration for the helical structure having a substantially helical flight composed of a plurality of sections having segments disposed in substantially right angular relation to an axis of rotation for the helical structure, introducing a moldable substance into the mold cavity to form the helical structure in the configuration and removing the helical structure from the mold cavity by separating the mold along a path substantially aligned with the segments. An apparatus for manufacturing a helical structure or the like, the apparatus including a first mold body having a mold cavity defining a first portion of a configuration for a helical structure having an axis of rotation with a substantially helical flight extending thereabout, a second mold body having a mold cavity defining a second portion of the configuration, and a structure for releasably interconnecting the first and second mold bodies for movement to and from an assembled relationship only along a path substantially right-angularly related to the axis of rotation of the configuration.

7 Claims, 9 Drawing Sheets

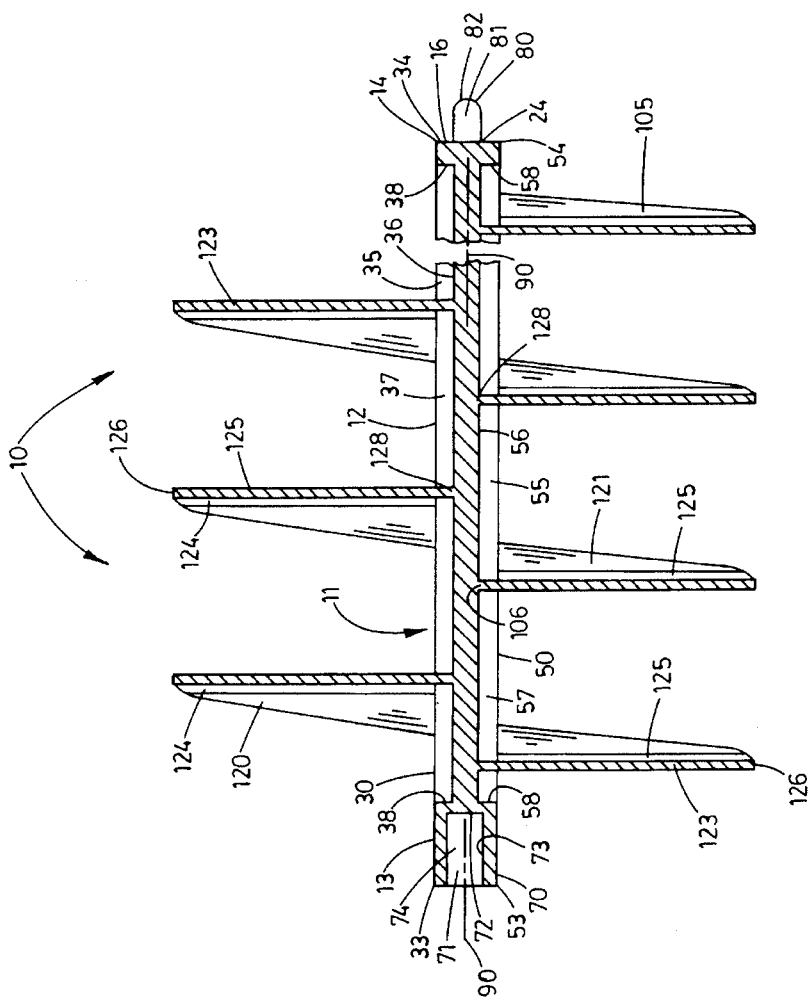
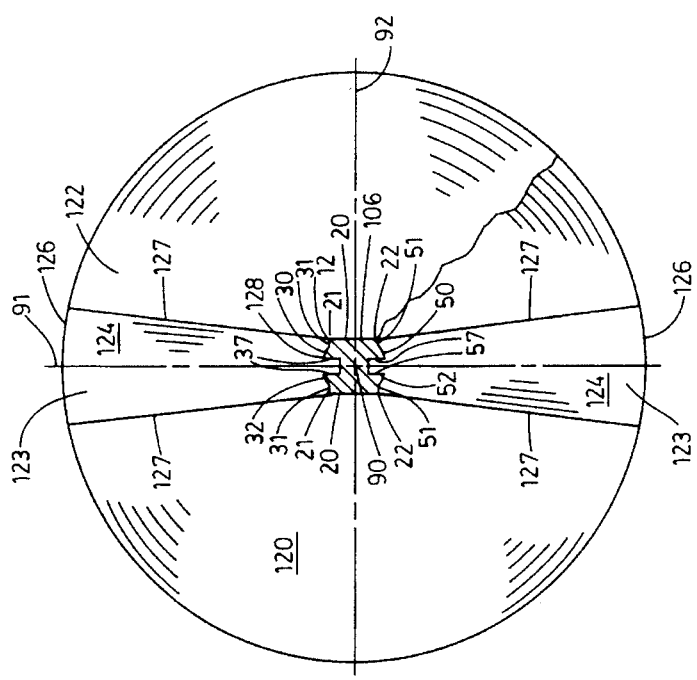

METHOD OF MANUFACTURING A HELICAL STRUCTURE

BACKGROUND OF THE INVENTION

1. Field of the Invention

The present invention relates to a helical structure and method and apparatus for manufacture thereof and, more particularly, to such an invention which permits helical structures to be manufactured in a form not heretofore achieved and having application in virtually all operative environments.

2. Description of the Prior Art

Helical structures, such as augers, screws, helical conveyors and the like, have application in a virtually limitless number of embodiments and operative environments. From antiquity, such structures have been employed for a vast assortment of purposes to achieve an equally impressive number of operational objectives. For example, the "Archimedean screw" was widely employed for moving water during the age of the Greeks. Essentially, such devices include a helical flight which is rotated about an axis of rotation to move material along a path of travel generally parallel to the axis of rotation.

In view of the antiquity of this basic mechanical movement, the prior art is replete with various embodiments of such helical structures as well as methods and apparatuses for the manufacture thereof. In general, such prior art efforts have been directed to the manufacture of such helical structures in relatively short subsections which, when assembled, are interconnected along the axis of rotation to form a helical structure of the length desired. While it has been recognized that it would be desirable to manufacture such helical structures as single, integral units, the technology has not been available to achieve this objective as a practical matter. Among the advantages to be achieved in the manufacture of helical structures as a single unit include strength, minimization of cost, weight reduction, overall structural integrity, reliability of operation and the like.

It has also been recognized as desirable to manufacture helical structures from thermal plastic materials so as significantly to reduce weight while achieving all of the aforementioned objectives. For example, the Lundell U.S. Pat. No. 4,976,341 discloses a segmented auger assembled from a plurality of auger segments made of inert material, such as polyethylene, for use in conveying abrasive and corrosive materials. In the case of the Lundell segmented auger, the segments are endwardly interconnected to complete the segmented auger. Another version of such a prior art device is revealed by the Lapeyre U.S. Pat. No. 4,852,719 which discloses a modular screw conveyor. Each module is molded of a suitable plastic material and has integrally formed therewith a cylindrical body. The modules are adapted to be endwardly interconnected to provide a screw conveyor of the desired length. While such prior art efforts are advances in the art and effective in achieving their stated objectives, the inability to form a helical structure in the desired length as a single, unitary entity has been a significant disadvantage for all of the reasons noted.

The specific operative environments in which such helical structures are employed present other reasons for desiring to produce helical structures in single, unitary forms. For example, it has been recognized that augers employed in vending machines would possess significant operative advantages if manufactured in this single unitary form. The augers are mounted in upright relation supporting vendable objects on the flight wall thereof. The collective weight of the vendables, the stresses induced by the upright attitude and other factors present operational difficulties where the auger is of segmented construction.

Therefore, it is an object of the present invention to provide a helical structure and method and apparatus for manufacture thereof which permit virtually any helical structure to be formed as a single, unitary structure in a single manufacturing process; which permit helical structures to be formed from thermal plastic material in precisely the length desired and without the need for assembly of the helical structure itself; which permit the complex geometry of such a helical structure to be achieved in a molding operation permitting the subsections of the mold to be removed from each other to free the helical structure without difficulty or damage to the helical structure; which have particular utility in the manufacture of such helical structures as augers employed in vending machines to dispense vendable objects dependably and inexpensively without the disadvantages heretofore associated therewith; and which are otherwise entirely effective in achieving their operational objectives.

SUMMARY OF THE INVENTION

Therefore, it is an object of the present invention to provide an improved helical structure and method and apparatus for manufacture thereof.

Another object of the invention is to permit the manufacture of helical structures in precisely the lengths desired as single, unitary structures and without the need for assembly thereof.

Another object is to provide such an invention which permits helical structures to be manufactured from thermal plastic material in precisely the lengths desired.

Another object is to provide such an invention which permits helical structures to be manufactured in a form of significantly less weight than has heretofore been achievable in the art.

Another object is to provide such an invention which permits the complex geometric form of a helical structure to be manufactured inexpensively, dependably and with a precision not heretofore achieved in the art.

Another object is to provide such an invention which permits helical structures to be manufactured from thermal plastic material by injection molding in a single, unitary form of the precise length desired while permitting the subsections of the mold employed in the molding process readily to be separated from each other to free the helical structure after the molding operation has been completed.

Another object is to provide such an invention which has particular utility in the manufacture of helical structures, such as augers, employed in vending machines to dispense vendable objects without the problems associated with prior art vending appliances.

Another object is to provide such an invention which is entirely compatible with conventional manufacturing processes so as to permit the ready adoption of the invention in practical application.

Further objects and advantages are to provide improved elements and arrangements thereof in an apparatus for the purpose described which is dependable, economical, durable and fully effective in accomplishing its intended purpose.

These and other objects are achieved, in the preferred embodiment of the present invention, in a helical structure having means defining an axis of rotation; and a substantially helical flight extending about the axis of rotation and composed of a plurality of sections each having a segment disposed in substantially right angular relation to the axis of rotation.

BRIEF DESCRIPTION OF THE DRAWINGS

FIG. 9 is a transverse vertical section taken from a position indicated by line 9—9 in FIG. 8.

FIG. 10 is a fragmentary, longitudinal, vertical section taken from a position indicated by line 10—10 in FIG. 8.

DESCRIPTION OF THE PREFERRED EMBODIMENT

Figure 2:
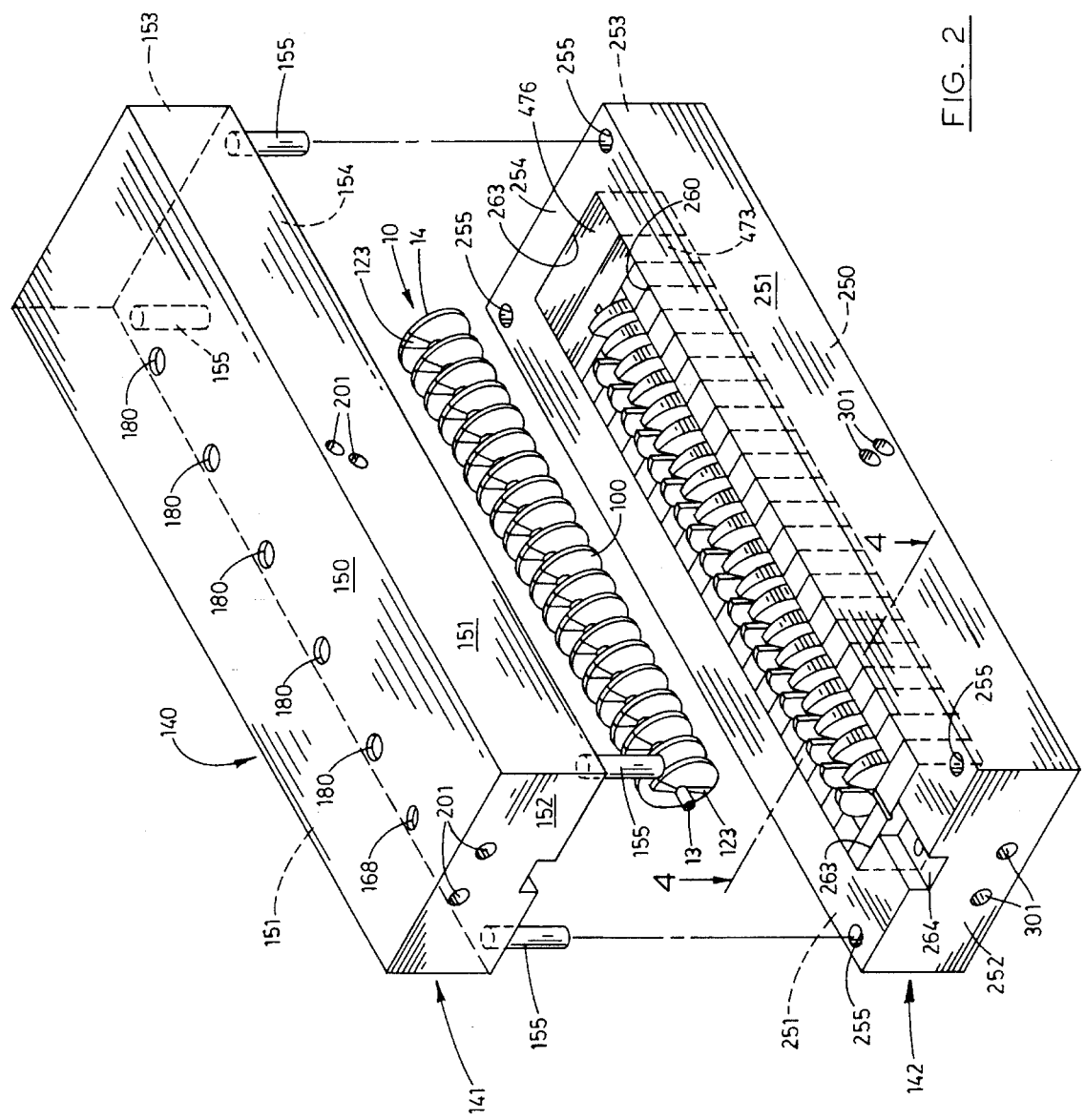
FIG. 2 is a somewhat reduced perspective view of the apparatus of FIG. 1 shown with the first and second mold bodies separated from each other to reveal the helical structure of the present invention manufactured in accordance with the method of the present invention employing the apparatus hereof.

Referring more particularly to the drawings, the helical structure of the present invention is generally indicated by the numeral 10 in FIG. 2. The helical structure of the present invention can be employed in a variety of embodiments for a variety of purposes such as, for example, as augers, screws, helical conveyors and the like. For illustrative convenience, the helical structure of the present invention, to the extent it is helpful, will be considered to be an auger which is to be employed in a vending machine, not shown, to vend objects which are supported thereby. The auger, in such a vending machine, may either be mounted for rotational movement in a vertical attitude or in a horizontal attitude depending upon the specific type of vending machine in which it is employed.

The helical structure 10 has an elongated shaft 11 having a first or central portion 12, a second or left end portion 13 and a third or right end portion 14. The shaft has a flat left end surface 15 which is right-angularly related to the shaft and a right end surface 16 which is also right-angularly related to the shaft.

The shaft 11 has parallel side surfaces 20, each having an upper edge 21 and a lower edge 22 parallel to each other. Each side surface has a left edge 23 and a right edge 24. The shaft has an upper surface 30 including flat shoulder portions and a central, convex arcuate portion. The upper surface has a left edge 33 and an opposite right edge 34. A groove, or slot, 35 if formed in the upper surface of the shaft extending between the left end portion 13 and right end portion 14 of the shaft. The slot is bounded by a flat interior surface 36, parallel side surfaces 37 and parallel end surfaces 38.

Figure 8:
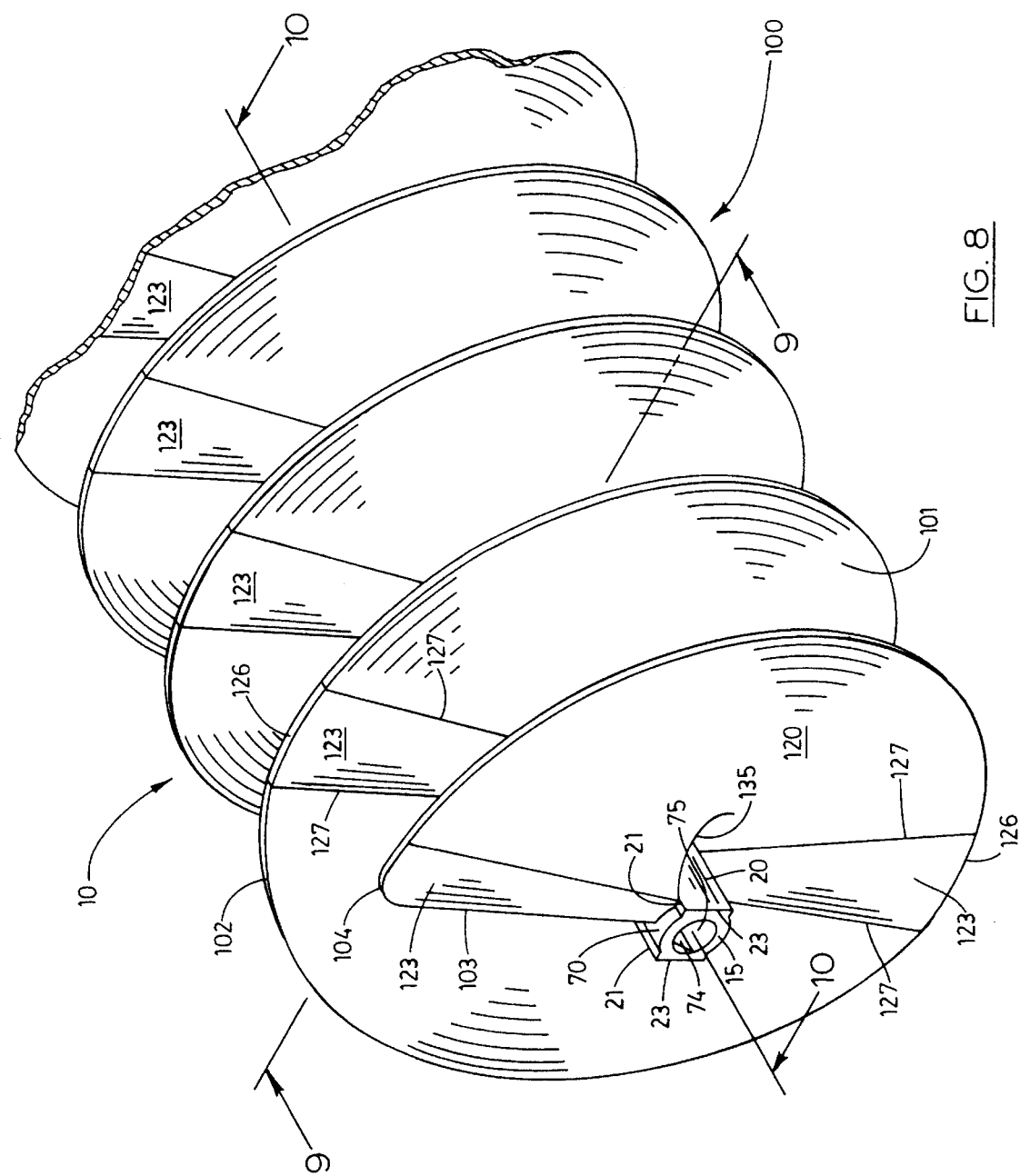
FIG. 8 is a fragmentary, perspective view of the helical structure of the present invention manufactured in accordance with the method of the present invention using the apparatus hereof.

The shaft 11 has a lower surface 50 which, as with the upper surface 30, has flat shoulder portions 51 interconnected by a convex arcuate portion 52. The lower surface has a left edge 53 and an opposite right edge 54. A groove, or slot, 55 is formed in the lower surface of the shaft extending between the left end portion 13 and the right end portion 14. The slot is bounded by a flat interior surface 56, parallel side surfaces 57 and parallel end surfaces 58. As best shown in FIGS. 8 and 10, the shaft 11 has a left mounting head 70 in which a bore, or passage, 71 is formed. The passage terminates in a flat interior surface 72 and is bounded by a cylindrical surface 73 right-angularly related thereto. However, a flat surface 74 is formed within the passage defining a plane right-angularly related to the interior surface 72 thereof. The passage has a mouth 75. The left mounting head is so dimensioned to provide a connection with the drive shaft of a suitable means, not shown, for rotating the shaft by engagement with the flat surface 74 to permit rotational force to be applied to the shaft.

The shaft 11 has a right mounting head, or projection, 80 extending from the right end surface 16 of the shaft. The projection has a cylindrical surface 81 and a convex terminal surface 82. The projection is dimensioned to be received in a bore serving as a bearing for rotation of the shaft by the driving means as previously described.

Referring more particularly to FIGS. 9 and 10, the shaft 11 can be viewed as having a longitudinal axis 90 about which the shaft is adapted to be rotated. For purposes of reference hereafter, the helical structure 10 can be viewed as having a vertical plane of reference 91 coextensive with the longitudinal axis 90 and a horizontal plane of reference 92, right-angularly related to the vertical plane of reference and also coextensive with the longitudinal axis 90.

The helical structure 10 includes a helix, or flight, 100 mounted on the shaft 11 extending between the left end portion 13 and the right end portion 14. The flight is formed by a flight wall 101 having a periphery, or outer edge, 102. The flight wall has a leading edge 103, best shown in FIG. 8, with an arcuate corner 104. The flight wall has a trailing edge 105, best shown in FIG. 10, and an interior edge 106 extending about the shaft 11.

As so constructed, the flight wall 101 has a continuous left, or upper surface, 120 and an opposite continuous right, or lower surface, 121. As can be visualized in FIGS. 8 and 9, the flight wall can be viewed as composed of a continuous series of one hundred and eighty degree (180°) sections 122. For example, one such one hundred and eighty degree (180°) section can be considered to be that portion of the flight wall to the left of the vertical plane of reference 91 shown in FIG. 9.

The flight wall contains a plurality of flight segments 123. If the entire flight wall is visualized as including a continuous series of one hundred and eighty degree (180°) sections 122 to the left and right of the vertical plane of reference 91, each such one hundred and eighty degree (180°) section includes portions of two such flight segments 123. For example, the one hundred and eighty degree (180°) section to the left of the vertical plane of reference, as shown in FIG. 9, includes one-half of two such flight segments 123. Each flight segment as a whole forms a continuous portion of the flight wall and has a left, or upper surface, 124 and an opposite right, or lower surface, 125. Each flight segment has an arcuate outer margin 126 which is coextensive with the outer edge 102 of the flight wall. Each flight segment includes a pair of lateral margins 127 which diverge from each other in a direction extending away from the shaft 11 and toward the arcuate outer margin 126. The lateral margins are straight and lead from an inner margin 128 individually coextensive with the upper edges 21, or lower edges, 22 of the parallel side surfaces 20 of the shaft.

Figure 3:
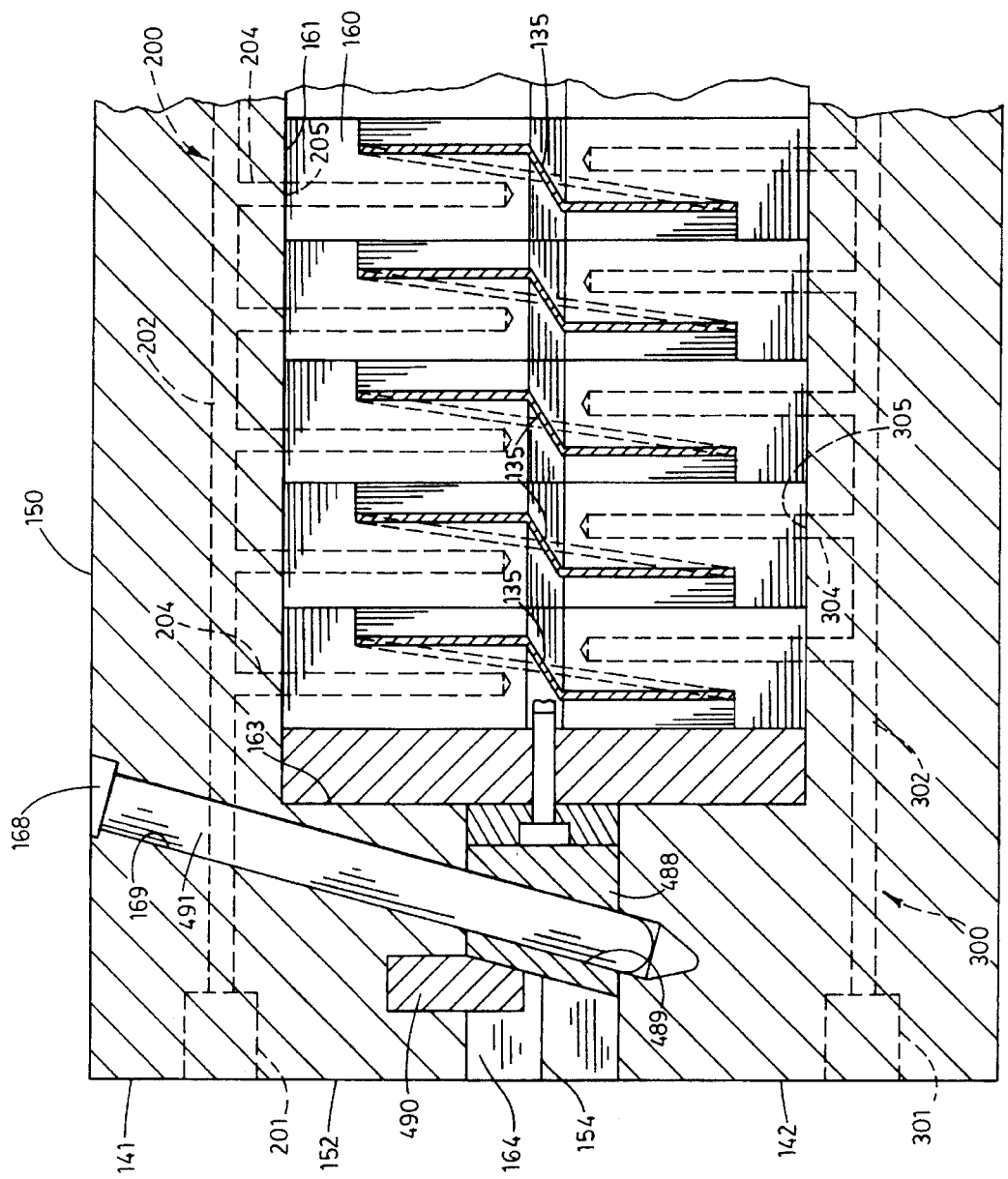
FIG. 3 is a somewhat enlarged, fragmentary, longitudinal vertical section taken on line 3—3 in FIG. 1.

As shown in FIG. 3, the flight wall 101 between adjacent flight segments has a lateral offset 135 immediately adjacent to the shaft 11 to accommodate the described orientation of the flight segments in the helical structure of the flight wall. However, as best shown in FIG. 8, outwardly from the lateral offset the flight wall assumes the helical configuration shown therein.

Figure 4:
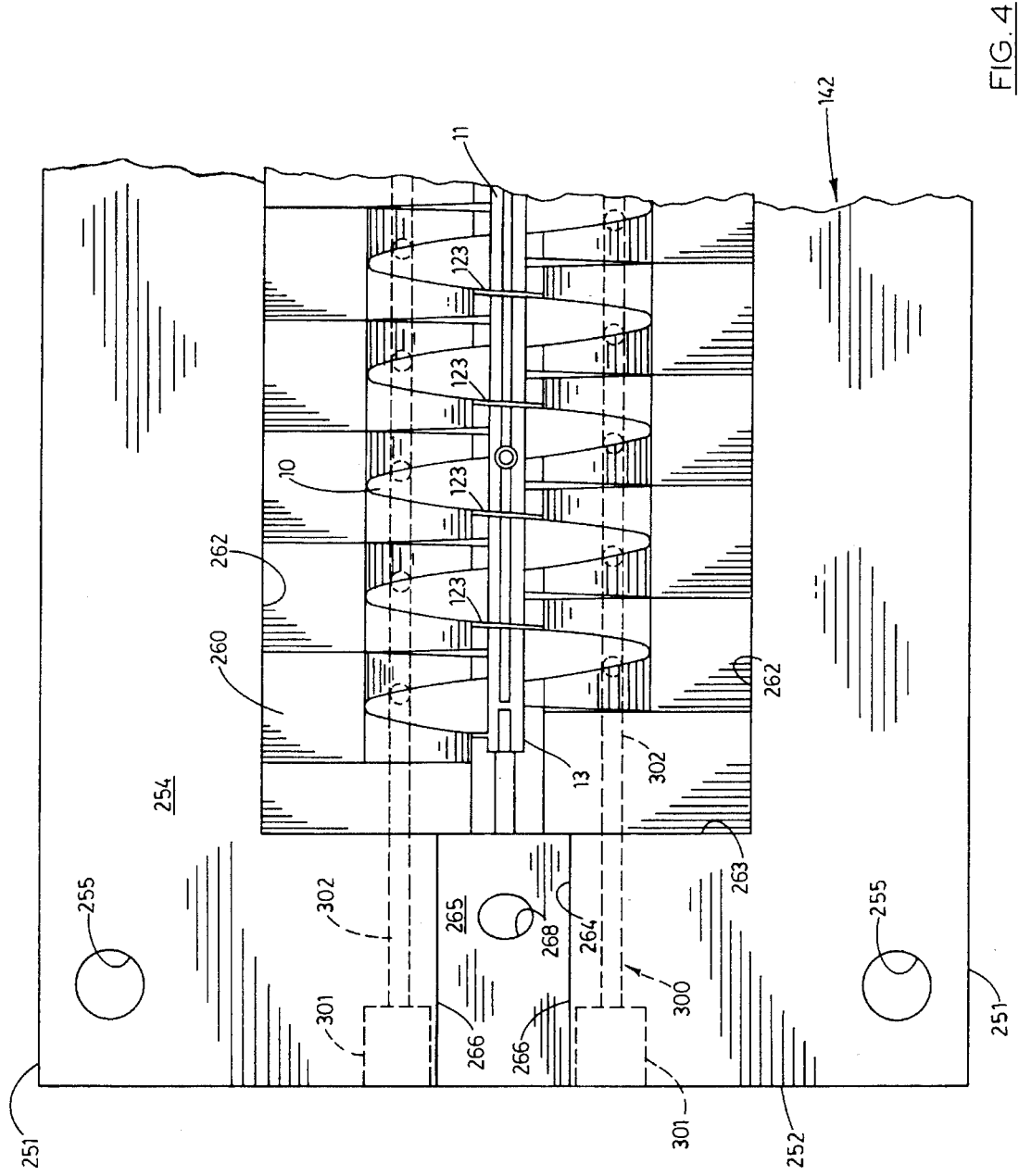
FIG. 4 is a somewhat enlarged, fragmentary plan view taken from a position indicated by line 4—4 in FIG. 2.

As best shown in FIGS. 9 and 10, the flight segments 123 are right-angularly related to the longitudinal axis 90 of the shaft 11, but, as shown in FIG. 4, are slightly canted so as more closely to follow the sloped plane defined by the flight wall. In the described embodiment, each flight segment is flat. However, other cross sections of the flight segments are possible in accordance with the present invention as long as the flight segments are right-angularly related to the longitudinal axis of the shaft in the vertical plane of reference 91. The purpose for this will subsequently become more clearly apparent.

Figure 1:
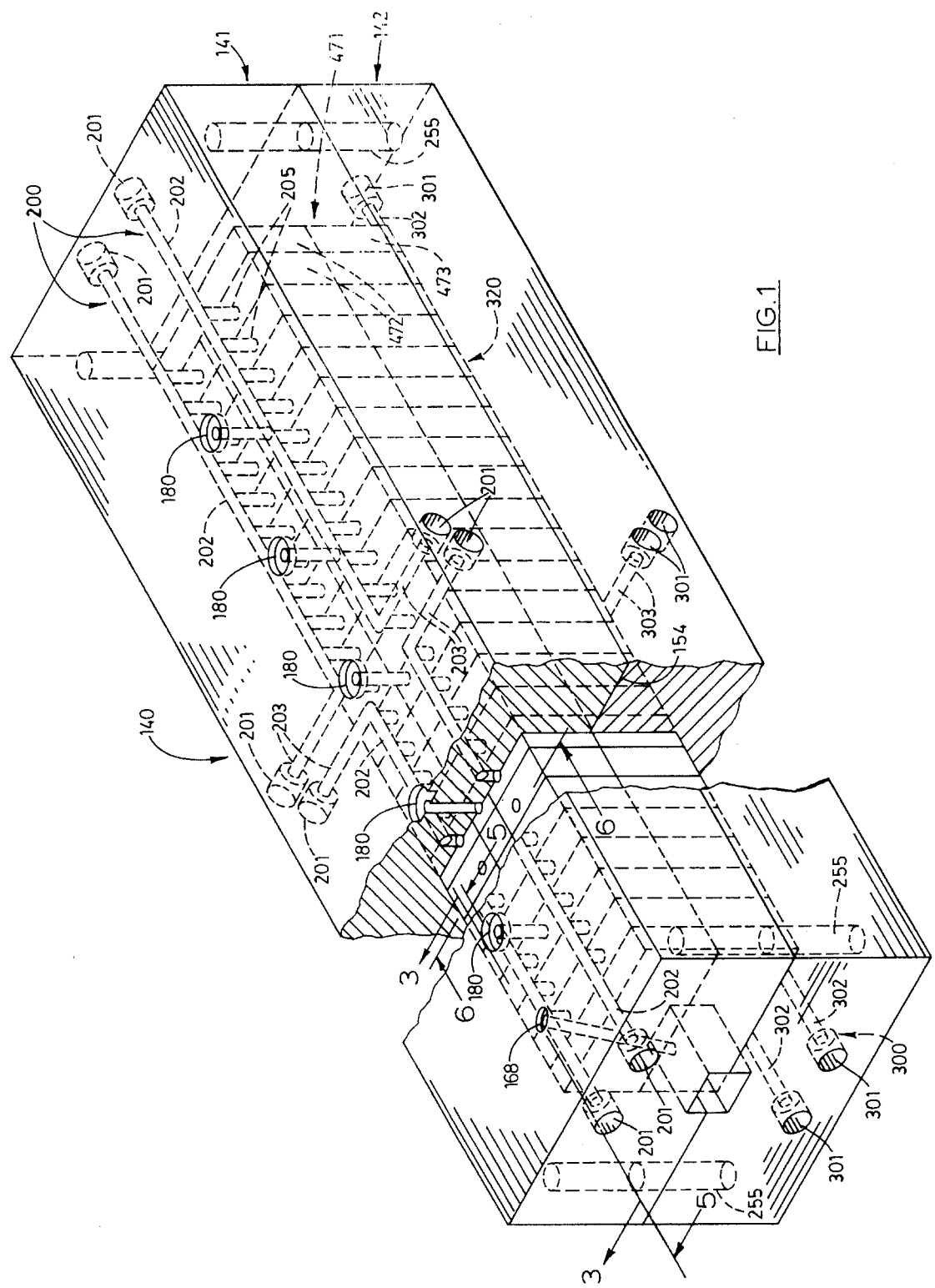
FIG. 1 is a fragmentary perspective view of the apparatus for manufacture of the helical structure of the present invention employing the method hereof.

The apparatus or mold of the present invention is generally indicated by the numeral 140 in FIG. 1. The mold includes an upper mold body 141 and a lower mold body 142. The upper mold body has a flat upper surface 150, parallel side surfaces 151, a left end surface 152 and an opposite right end surface 153. The upper mold body has a parting surface 154 which is parallel to the upper surface 150 and which, during use of the mold as will hereinafter be described, is coplanar with the horizontal plane of reference 92. As shown in FIG. 2, four mating pins 155 extend downwardly from the parting surface 154 in right angular relation thereto individually adjacent to the junctures between the side surfaces 151 and their respective left or right end surfaces 152 and 153.

The upper mold body 141 has a mold element chamber 160 therewithin. The mold element chamber has a flat interior surface 161 parallel to the upper surface 150 of the upper mold body, parallel side surfaces 162 right-angularly related to the interior surface and opposite end surfaces 163 parallel to each other and right-angularly related both to the side surfaces 162 and the interior surface 161. A lateral channel 164 extends from the mold element chamber to the left, as viewed in FIG. 3, extending through the left end surface 152 of the upper mold body. The lateral channel includes a flat interior surface 165 and parallel side surfaces 166 right-angularly related to the interior surface. A slot 167 extends upwardly from the lateral channel. An inlet opening 168 extends inwardly from the upper surface 150 of the upper mold body and has a counter bore 169 extending therefrom at the oblique angle shown in FIGS. 3 and 5 into the lateral channel 164.

The upper mold body mounts a plurality of injector assemblies 180 of a conventional type adapted to inject a moldable substance, such as plastic into a mold for purposes of producing a molded object using a mold. Each injector assembly includes an inlet opening 181 with a counter bore 182. A mounting opening 183 extends from the counter bore into communication with the mold element chamber 160 and has an insert 184 received therein defining an injection passage 185. The insert has a flat outer surface 186 which is coplanar with the interior surface 161 of the mold element chamber.

The upper mold body 141 contains a cooling system 200 which may be most easily visualized upon reference to FIG. 1. The cooling system includes a plurality of connection openings 201 communicating with the exterior of the upper mold body through a surface thereof. Longitudinal passages 202 and transverse passages 203 interconnect the connection openings, as shown in FIG. 1, to establish a path of fluid flow through the upper mold body. The cooling system includes a plurality of vertical, or branch passages, 204 which extend downwardly to communicate with the mold element chamber 160 through individual mouths 205 in predetermined positions.

The lower mold body 142 has a flat lower surface 250, parallel side surfaces 251 which are right-angularly related to the lower surface, a left end surface 252 and right end surface 253 which are parallel to each other and right-angularly related to the lower surface and side surfaces of the lower mold body. The lower mold body has a parting surface 254 dimensioned and adapted to be placed in facing engagement with the parting surface 154 of the upper mold body 141 mating passages 255 extend inwardly from the parting surface 254 in positions corresponding to those of the mating pins 155 of the upper mold body. Thus, the upper mold body and lower mold body can be moved toward each other to place the parting surfaces in facing engagement and the sliding engagement of the mating pins and mating passages control such movement so as to be possible only along a path right-angularly related to the parting surfaces and, thereby, in the assembled configuration, along a path along the vertical plane of reference 91.

Figure 5:
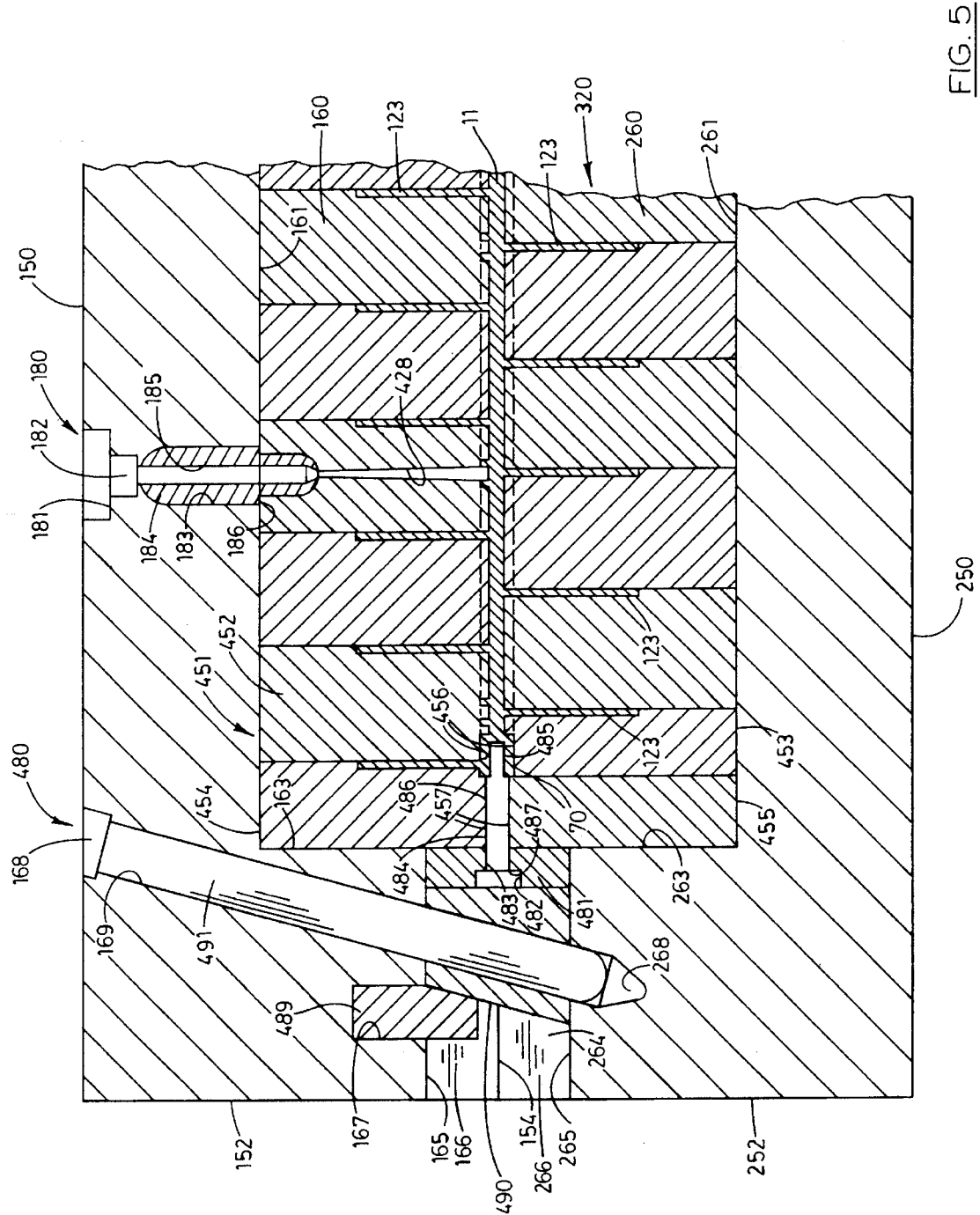
FIG. 5 is a somewhat enlarged, fragmentary, longitudinal vertical section taken from a position indicated by line 5—5 in FIG. 1.

The lower mold body 142 has a mold element chamber 260 corresponding to the mold element chamber 160 of the upper mold body. The mold element chamber 260 has a flat interior surface 261, parallel side surfaces 262 right-angularly related to the interior surface and end surfaces 263 right-angularly related to the interior surface and to the side surfaces. A lateral channel 264 corresponding to lateral channel 164 of the upper mold body extends from the mold element chamber through the left end surface 252 of the lower mold body. The lateral channel has an interior surface 265 and parallel side surfaces 266 right-angularly related to the interior surface. A bore 268 extends inwardly of the lower mold body through the interior surface 265 in axial alignment with the counter bore 169, as shown in FIGS. 3 and 5.

The lower mold body 142 has a cooling system 300 corresponding to the cooling system 200 of the upper mold body 141. The cooling system 300 includes a plurality of connection openings 301 which are interconnected by longitudinal passages 302 and communicating transverse passages 303. A plurality of vertical, or branch passages, 304 extend upwardly from the longitudinal passages to communicate with the mold element chamber 260 in predetermined positions through individual mouths 305.

In an operational configuration, the mold element chambers 160 and 260 house a mold element assembly 320. The mold element assembly is composed of a plurality of mold element subassemblies 321, shown best in FIGS. 6 and 7. Each of the mold elements subassemblies 321 includes a left upper element 330 having a flat interior surface 331, a side surface 332 right-angularly related to interior surface 331 and a front surface 333 right-angularly related to both the interior surface and the side surface. The left upper element has a rear surface 334 right-angularly related to the interior surface 331. A projection 335 extends downwardly from the left upper element and includes an arcuate cavity surface 336 and a sloped cavity surface 337. The left upper element has a flat facing surface 338 parallel to the interior surface 331 and an arcuate facing surface 339. The left upper element has a flat interior facing surface 340, an outwardly sloped interior facing surface 341, a sloped shoulder surface 342 and an inwardly sloped interior facing surface 343. A vertical passage 344 extends inwardly of the left upper element through and at right angles to the interior surface 331. The vertical passage communicates with the exterior of the left upper element through a mouth 345.

Figure 7:
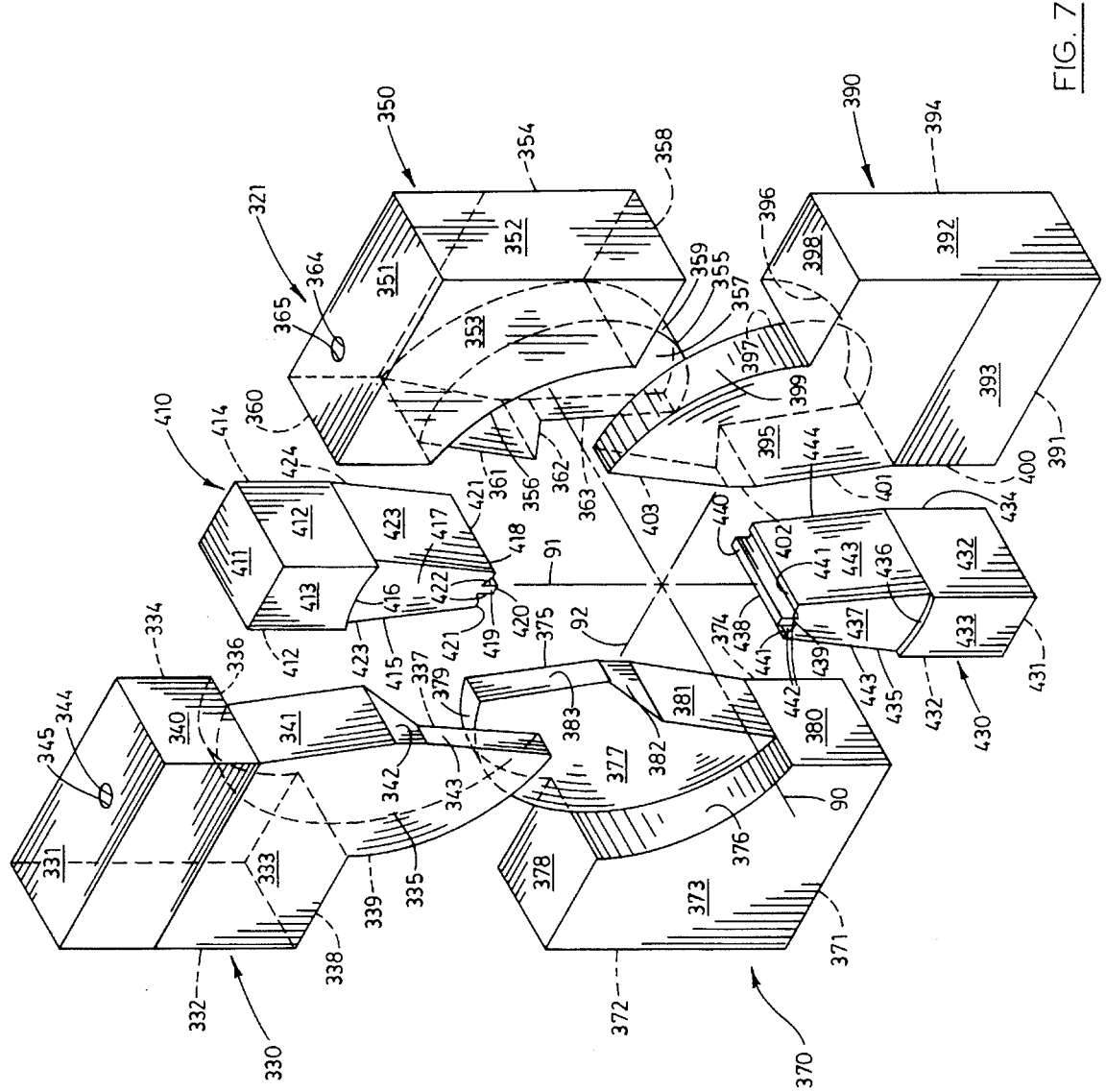
FIG. 7 is a perspective view of a mold element subassembly of the apparatus of the present invention shown in an exploded view.

Each mold element subassembly 321 includes a right upper element 350 having the same portions as described relative to the left upper element 330 except that, as shown in FIG. 7, it is oriented one hundred and eighty degrees (180°) from the orientation of the left upper element. The right upper element has a flat interior surface 351, a side surface 352 right-angularly related thereto, a front surface 353 right-angularly related to both the interior and the side surfaces and a rear surface 354 parallel to front surface 353. A projection 355 extends downwardly from the right upper element and has an arcuate cavity surface 356 and a sloped cavity surface 357. The right upper element has a flat facing surface 358 parallel to the interior surface 351 and an arcuate facing surface 359. The right upper element has a flat interior facing surface 360 right-angularly related to interior surface 351, outwardly sloped interior facing surface 361, inwardly facing shoulder surface 362 and inwardly sloped interior facing surface 363. A vertical passage 364 extends inwardly of the right upper element in right angular relation to the interior surface 351 and communicating therethrough through a mouth 365.

Each mold element subassembly 321 includes a right lower element 370 which is also identical to the left upper element 330 and to the right upper element 350, but inverted relative thereto, as shown in FIG. 7. The right lower element has a flat interior surface 371, a side surface 372 right-angularly related to the interior surface, a front surface 373 right-angularly related to the interior surface and the side surface and a rear surface 374 parallel to the front surface. A projection 375 extends upwardly from the right lower element and has an arcuate cavity surface 376 and a sloped cavity surface 377. The right lower element has a flat facing surface 378 parallel to the interior surface 371 and an arcuate facing surface 379. The right lower element has a flat interior facing surface 380 parallel to the side surface 372, an outwardly sloped interior facing surface 381, an inwardly sloped shoulder surface 382 and an inwardly sloped interior facing surface 383. A vertical passage 384 extends inwardly of the right lower element in right angular relation to the interior surface 371 and communicates therewith through a mouth 385.

Each mold element subassembly 321 includes a right lower element 390 which is also identical to the left upper element 330 and to the right upper element 350, but inverted relative thereto, as shown in FIG. 7. The right lower element has a flat interior surface 391, a side surface 392 right-angularly related to the interior surface, a front surface 393 right-angularly related to the interior surface and the side surface and a rear surface 394 parallel to the front surface. A projection 395 extends upwardly from the right lower element and has an arcuate cavity surface 396 and a sloped cavity surface 397. The right lower element has a flat facing surface 398 parallel to the interior surface 391 and an arcuate facing surface 399. The right lower element has a flat interior facing surface 400 parallel to the side surface 392, an outwardly sloped interior facing surface 401, an inwardly sloped shoulder surface 402 and an inwardly sloped interior facing surface 403. A vertical passage 404 extends inwardly of the right lower element in right angular relation to the interior surface 391 and communicates therewith through a mouth 405.

Each mold element subassembly 321 has an upper central element 410, as shown in FIG. 7. The upper central element has a flat interior surface 411, parallel side surfaces 412 which are right-angularly related to the interior surface 411 and a front surface 413 right-angularly related to both the interior and side surfaces. The upper central element has a rear surface 414 parallel to front surface 413 and has a downwardly extending projection 415. The projection 415 includes a downwardly facing arcuate cavity surface 416 and a sloped flat cavity surface 417. The upper central element has a distal cavity surface 418 which includes a central ridge 419 having a face 420. The distal cavity surface includes lateral shoulder surfaces 421 and concave arcuate surfaces 422. The upper central element has tapered lateral shoulders 423 and a flat rear surface 424.

The mold element assembly 320 has a plurality of injection passages 428 extending therethrough into communication with the mold cavity, as shown in FIG. 5. One such injection passage is positioned in alignment with each of the injector assemblies 180. The specific number and positions of the injector assemblies and their respective injection passages 428 is dependent only upon conventional techniques in injection molding technology.

Each mold element subassembly 321 has an lower central element 430, as shown in FIG. 7. The lower central element has a flat interior surface 431, parallel side surfaces 432 which are right-angularly related to the interior surface 431 and a front surface 433 right-angularly related to both the interior and side surfaces. The upper central element has a rear surface 434 parallel to front surface 433 and has a downwardly extending projection 435. The projection 435 includes a downwardly facing arcuate cavity surface 436 and a sloped flat cavity surface 437. The upper central element has a distal cavity surface 438 which includes a central ridge 439 having a face 440. The distal cavity surface includes lateral shoulder surfaces 441 and concave arcuate surfaces 442. The upper central element has tapered lateral shoulders 443 and a flat rear surface 444.

The mold element assembly 320 includes a left mold element subassembly 451 shown best in FIGS. 3 and 5. The left mold element subassembly includes a pair of first upper mold elements 452, a pair of first lower mold elements 453, a pair of second upper mold elements 454 and a pair of second lower mold elements 455. These mold elements 452, 453, 454 and 455 are, except as herein noted, identical to those of each mold element subassembly 321, except as herein described. The mold elements 452, 453, 454 and 455 have left mounting head forming surfaces 456 configured so as to form the left mounting head 70 of the helical structure 10 as a consequence of the molding operation hereinafter described.

The mold element assembly 320 further includes a right mold element subassembly 471 generally indicated in FIG. 1. The right mold element subassembly includes upper mold elements 472 and lower mold elements 473 which have portions so configured as to form the right end portion 14 of the shaft 11 including the projection 80 thereof. A wedge block 476 shown in FIG. 2 retains the mold elements in each of the mold element chambers.

The apparatus 140 has a probe mounting assembly 480 shown best in FIGS. 3 and 5. The probe mounting assembly includes a probe mounting wall 481 adapted, when the mold 140 is assembled, slidably to be moved to the position shown in FIGS. 3 and 5 in facing engagement with the left mold elements 454. The probe mounting wall has a probe opening 482 which communicates with a probe counter bore 483 extending through the probe mounting wall. A probe, or core pin, 484 is slidably received in the probe opening and probe counter bore and in the assembled position shown in FIGS. 3 and 5 extending through the probe passage 457 of the left mold elements 454. The core pin has a mold end portion 485 extending beyond the left mold elements and into the area defined by the left mounting head forming passages 456 of the mold elements 452, 453, 454 and 455 in position to define a surface cooperative therewith for the formation during the molding process of the left mounting head 70 and passage 71 thereof. The core pin has a cylindrical shaft 486 extending through the probe counter bore 483 and probe passage 457. The core pin has a head 487 dimensioned to be received in the probe opening 482. A slide block 488 is adapted to be received in and moved inwardly of the passage defined by the lateral channels 164 and 264 of the respective upper and lower mold bodies 141 and 142, respectively. The slide block is adapted to be moved to the position shown in FIGS. 3 and 5 in facing engagement with the probe mounting wall 481. The slide block has a slide block passage 489 which, in the position described, is axially aligned with the counter bore 169. A lock member 490 is adapted slidably to be positioned in the slot 167 of the upper mold body in facing engagement with the rear of the slide block 488 to retain it in the position described. A lock pin 491 is dimensioned slidably to be received in the inlet opening 168 and counter bore 169 and passed through the slide block passage 489 into the position shown in FIGS. 3 and 5 to lock the slide block and thus the core pin 484 in the position described.

OPERATION

The operation of the described embodiment of the subject invention and the practice of the method thereof is believed to be clearly apparent and is briefly summarized at this point.

The mold 140 is placed in an operative condition by connection of conventional supporting systems to the mold for operation thereof. Thus, sources of cooling fluid are connected to the connection openings 201 of the upper mold body 141 and to the connections 301 of the lower mold body 142. Since these are entirely conventional subsystems, they need not be described here. Similarly, a conventional injection molding subsystem is connected to the injector assemblies 180 of the upper mold body 141 for purposes of injecting a moldable substance into the mold as hereinafter described.

The mold element assembly 320 is installed in the mold element chamber 160 of the upper mold body and the mold element chamber 260 of the lower mold body 142. More specifically, the left upper element 330, right upper element 350 and upper central element 410 are mounted in the mold element chamber 160 of the upper mold body and the left lower element 370, right lower element 390 and lower central element 430 are positioned in the mold element chamber 260 of the lower mold body. The mold elements are arranged in the manner heretofore described and illustrated in the drawings. This is particularly well depicted in FIGS. 6 and 7. The mold elements in each of the mold element chambers are secured in position using the wedge block 476. When mounted in position as described and shown herein, when the mold 140 is closed, the mold elements engage each other as heretofore described and shown so as to form a mold cavity in the form of the helical structure 10.

The probe mounting wall 481, having the core pin 484 extending through the opening 482 and counter bore 483 thereof, are moved to the position shown in FIGS. 3 and 5.

Figure 6:
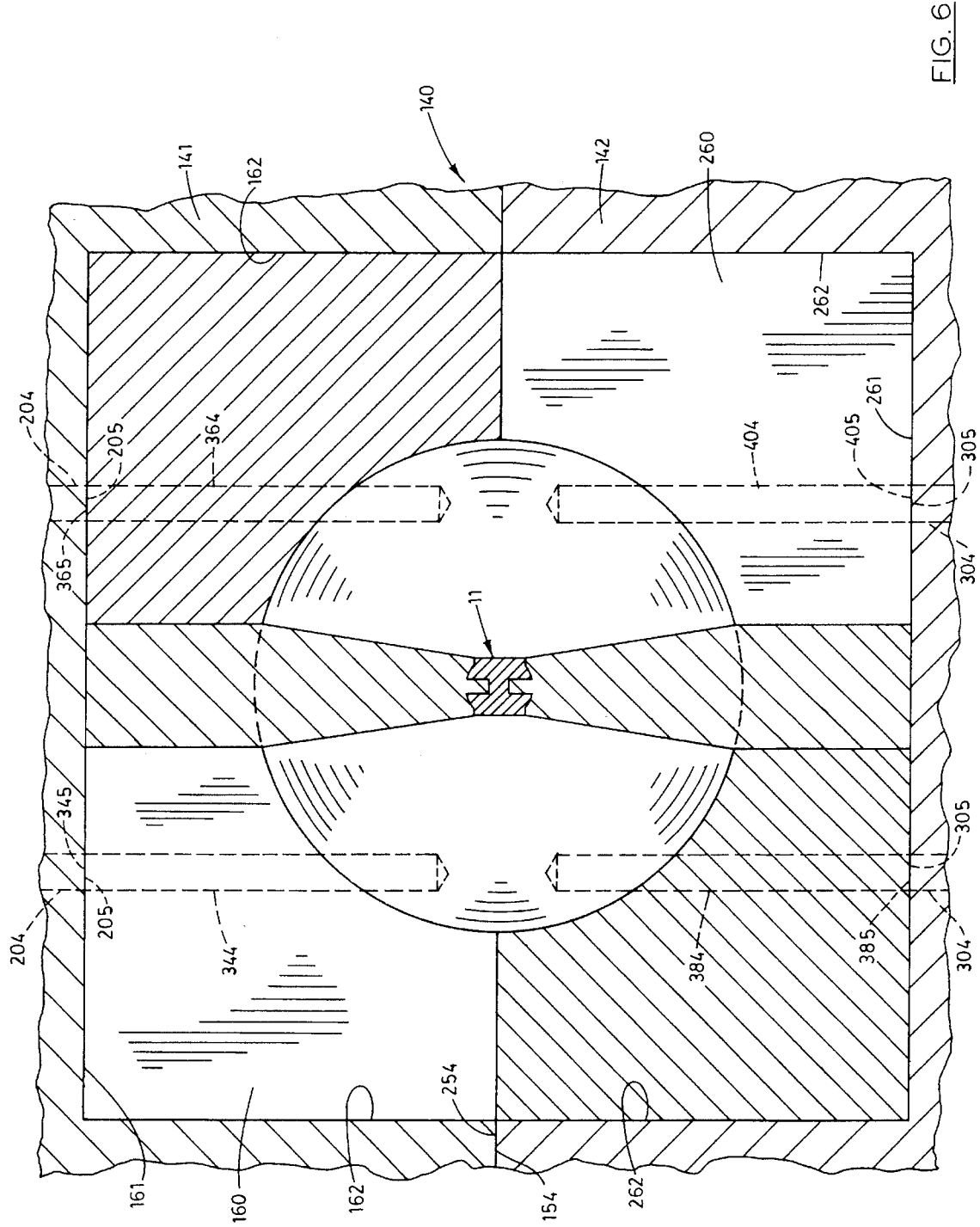
FIG. 6 is a somewhat enlarged, fragmentary, transverse vertical section taken from a position indicated by line 6—6 in FIG. 1.

Subsequently, the upper mold body 141 is moved into registry with the lower mold body 142. More specifically, the upper mold body is positioned with the mating pins 155 received in the passages 255 and the upper and lower mold bodies move together so that the respective parting surfaces 154 and 254 thereof are disposed in facing engagement. The upper and lower mold bodies are then bound together using any conventional subsystem, not shown. As has previously been described, movement of the upper and lower mold bodies to the closed position described causes the mold elements in the mold element chambers to be brought together in the arrangement described so that they collectively define the configuration of the helical structure 10 to be formed using the mold 140. As to each mold element subassembly 321, the relationship achieved is as shown in FIG. 6 and may additionally be visualized upon reference to FIG. 7.

Subsequently, the slide block 488 is moved to the position shown in FIGS. 3 and 5, the lock member 490 inserted to lock the slide block in the position described and the lock pin 491 inserted in the inlet opening 168 and counter bore 169 and to be moved into the slide block passage 489 to lock the slide block in the position described and thus retain the mold end portion 485 in the position shown in FIGS. 3 and 5 for formation of the passage 71 of the left mounting head 70 of the helical structure.

Once the mold 140 is assembled and connected to the subsystems in the manner described, it is in condition for use in the production of the helical structure 10 of the present invention. The subsystems including the cooling system 200 and cooling system 300 and the injector assemblies 180 connected to the injection molding subsystem, not shown, are activated in accordance with conventional practice. This causes the mold cavity defined by the mold element assembly 320, probe mounting assembly 480 and left and right wedge blocks 474 and 476 to be injected and completely filled with the moldable substance, preferably plastic. In accordance with conventional injection molding practices, the mold is otherwise operated in such a manner as to produce the helical structure 10 in the form heretofore described and to cure in the manner required by the specific moldable substance involved to the point that the upper and lower mold bodies 141 and 142 are to be separated from each other to release the resulting helical structure from the mold 140.

Release of the helical structure 10 from the mold 140 is achieved by releasing the clamping mechanism, heretofore described, from the upper and lower mold bodies 141 and 142. Once such release has been achieved, the upper and lower mold bodies can be moved from each other to separate the parting surfaces 154 and 254 thereof along the course defined by engagement of the mating pins 155 and mating passages 255. Such engagement of the mating pins and mating passages ensures that the upper and lower mold bodies are separated from each other along a course right-angularly related to the parting surfaces or, in other words, along the vertical plane of reference 91 and right-angularly related to the horizontal plane of reference 92. Since, as previously discussed in detail, the flight segments 123 are disposed in right angular relation to the longitudinal axis 90 of the shaft 11, and since the lateral offsets 135 of the flight wall 101 are so configured as to accommodate the attitudes of the flight segments 123, the upper and lower mold bodies are free to be moved from each other for release of the helical structure from the mold 140 without any risk of damage thereto. Stated another way using terminology from the industry, there are no "under cuts" which interfere with movement of the upper and lower mold bodies from each other in right angular relation to the parting surfaces 154 and 254.

However, prior to release of the helical structure from the mold 140, the lock pin 491 is removed from the slide block passage 489 and the inlet opening 168 and counter bore 169. Similarly, the lock member 490 is removed from the slot 167, the slide block 488 removed from the passage defined by the lateral channel 164 and lateral channel 264 and the probe mounting wall 481 and core pin 484 removed from the resulting helical structure. Similarly, the right mold element subassembly 471 is removed so as to release the right end portion 14 of the shaft 11. Subsequently, the helical structure 10 is removed from the mold 140 and, more specifically from the mold element assembly 320 for subsequent use.

Therefore, the present invention provides a helical structure and method and apparatus for manufacture thereof which permit virtually any helical structure to be formed as a single, unitary structure in a single manufacturing process; which permit helical structures to be formed from thermo plastic material in precisely the length desired and without the need for assembly of the helical structure; which permit the complex geometry of such a helical structure to be achieved in a molding operation permitting the subsections of the mold to be removed from each other to free the helical structure without difficulty or damage to the helical structure; which have particular utility in the manufacture of such helical structures as augers employed in vending machines to dispense vendable objects dependably and inexpensively without the disadvantages heretofore associated therewith; and which are otherwise entirely effective in achieving its operational objectives.

Although the invention has been herein shown and described in what is conceived to be the most practical and preferred embodiment, it is recognized that departures may be made therefrom within the scope of the invention which is not to be limited to the illustrative details disclosed.

Having described our invention, what we claim as new and desire to secure by Letters Patent is:

1. A method for manufacturing a helical structure having a central shaft, comprising the steps of:
   producing a mold having a mold cavity defining a configuration for said helical structure having a substantially helical flight extending about a shaft and to a peripheral edge and substantially defining an axis of rotation for the helical structure and wherein said helical flight is composed of a plurality of sections having segments disposed in substantially right angular relation to said axis of rotation of the helical structure and said segments being of a substantially constant thickness from the shaft to said peripheral edge;
   introducing a moldable substance into the mold cavity to form said helical structure in said configuration; and
   removing the helical structure from the mold cavity by separating the mold along a path substantially aligned with said segments.

2. The method of claim 1 wherein in said producing step the mold cavity is so formed that the sections of the substantially helical flight extend about the axis of rotation substantially three hundred and sixty degrees (360°) and have two of said segments disposed in substantially right angular relation to the axis of rotation and extending in opposite directions from said axis of rotation.

3. A method for manufacturing a helical structure having a central shaft, comprising the steps of:
   producing a mold having a mold cavity defining a configuration for said helical structure having a substantially helical flight extending about a shaft, having substantially flat sides, and substantially defining an axis of rotation and wherein said helical flight is composed of a plurality of sections having segments disposed in substantially right angular relation to an axis of rotation of the helical structure and said segments individually define planes extending from the shaft between said flat sides substantially right-angularly related to said axis of rotation;
   introducing a moldable substance into the mold cavity to form said helical structure in said configuration; and
   removing the helical structure from the mold cavity by separating the mold along a path substantially aligned with said segments.

4. The method of claim 3 wherein in said producing step the configuration defined by the mold cavity includes said segments being of a width at the shaft not smaller than the width of the shaft.

5. A method for manufacturing a helical structure having a central shaft, comprising the steps of:
   producing a mold having a mold cavity defining a configuration for said helical structure having a substantially helical flight extending about a shaft substantially defining an axis of rotation and wherein said helical flight is composed of a plurality of sections having segments disposed in substantially right angular relation to an axis of rotation for the helical structure and wherein the substantially helical flight adjacent to said shaft and between the segments it disposed at a greater angle to the axis of rotation than is the substantially helical flight adjacent to the shaft within the segments to accommodate said substantially right angular relation of the segments to the axis of rotation;
   introducing a moldable substance into the mold cavity to form said helical structure in said configuration; and
   removing the helical structure from the mold cavity by separating the mold along a path substantially aligned with said segments.

6. The method of claim 5 wherein in said introducing step the moldable substance is injected into the mold cavity to fill the entire mold cavity.

7. The method of claim 5 wherein in said introducing step the moldable substance is plastic.

\* \* \* \* \*

UNITED STATES PATENT AND TRADEMARK OFFICE
CERTIFICATE OF CORRECTION

PATENT NO. : 5,498,387
DATED : March 12, 1996
INVENTOR(S) : DANIEL S. CARTER; DENNIS M. RUPP; DAVID O. BESS It is certified that error appears in the above-identified patent and that said Letters Patent is hereby corrected as shown below:

Column 12, line 46, after "segments," delete "it" and substitute

---is---.

Signed and Sealed this

Ninth Day of July, 1996

Attest:

BRUCE LEHMAN

Attesting Officer

Commissioner of Patents and Trademarks